United States Patent [19]

Hines et al.

[11] 4,327,393

[45] Apr. 27, 1982

[54] PROTECTOR MODULE BASE ASSEMBLY WITH AN EXTERNAL SPARK GAP

[75] Inventors: William W. Hines; Casimir Z. Cwirzen, both of Arlington Heights, Ill.

[73] Assignee: Northern Telecom, Inc., Nashville, Tenn.

[21] Appl. No.: 110,115

[22] Filed: Jan. 7, 1980

[51] Int. Cl.[3] .............................................. H02H 9/04

[52] U.S. Cl. .................................. 361/119; 361/124; 361/120; 337/32; 337/34

[58] Field of Search .............. 361/119, 118, 124, 120, 361/117; 337/28, 29, 31, 32, 33, 34

[56] References Cited

U.S. PATENT DOCUMENTS

| | | | |
|---|---|---|---|
| 3,755,715 | 8/1973 | Klayum et al. | 361/120 |
| 4,132,915 | 1/1979 | Wilms | 361/120 X |
| 4,133,019 | 1/1979 | Roach et al. | 361/124 |
| 4,158,869 | 6/1979 | Gilberts | 361/120 X |

*Primary Examiner*—Patrick R. Salce
*Attorney, Agent, or Firm*—Spencer & Kaye

[57] ABSTRACT

An electrical surge arrester module having a back-up external spark gap in its base assembly comprising an insulator plate perforated at points intermediate a terminal contact surface in said base assembly and a conductive plate at ground potential when said surge arrester module is in use.

7 Claims, 3 Drawing Figures

10
11
12
13
14
15
16
17
17a
18
19
20
21
22
23
30
31
32

PROTECTOR MODULE BASE ASSEMBLY WITH AN EXTERNAL SPARK GAP

The present invention relates to circuit protector modules, and particularly to those having an external spark gap for the case of failure of the main protection mechanism.

There are generally two types of protectors, one known as the open-gap protector which comprises two spaced carbon electrodes, one connected to the protected circuit and the other to ground. The other type is the gas tube type arrester, which comprises two spaced metal electrodes with an ionizable gaseous medium hermetically sealed therebetween at less than atmospheric pressure.

In using the gas tube arresters to protect primary equipment at the subscriber's premises, it has become necessary to enhance the fail-safe operation of such devices by providing a back-up external spark gap at atmospheric pressure in conformance with Underwriters Laboratories' requirements 497. The external spark gap would provide protection against overvoltage surges when the main gas tube, for whatever reasons, fails to arrest the harmful surge. While it is true that the external spark gap threshold voltage is nowhere near as accurately selectable as that of a gas tube arrester, as a back-up mechanism it nevertheless is acceptable.

Of course, it is most desirable to provide an external spark gap as simply as possible, without appreciably disrupting or altering the structure of existing surge protectors. The cost can thus be kept low, and replaceability of the old modules with new ones is made easy.

It is, therefore, an object of the present improvement to provide an external spark gap in a so-called building entry protector module which does not greatly alter its shape or method of assembly.

A feature of the present improvement is that the external spark is introduced in the base assembly by adding two contiguous, substantially coextensive, plates, one conductive next to the inner base surface, and the other an insulator separating the plug contacts from the ground plate. Both the ground and insulator plates have holes for the passage of the plugs without establishing contact with the ground plate. In addition, the insulator plate has holes intermediate the plug contacts and the ground plate, which holes constitute the external spark gap. Thus, in addition to the protection provided by the gas tube between the plugs and ground, further protection is provided by the external gap between the plugs (via their contacts) and ground (via the ground plate). Conveniently, the ground plate is grounded by passing the grounding plug of the module through a hole in the ground plate to ensure some contact with the grounding plug.

Thus, according to the present invention, there is provided an electrical surge arrester module having a back-up external spark gap in its base assembly comprising an insulator plate perforated at points intermediate a terminal contact surface in said base assembly and a conductive plate at ground potential when said surge arrester module is in use.

The details of the external spark gap assembly will be better understood when describing two example embodiments in conjunction with the accompanying drawings, in which.

Figures 1, 2, 3:
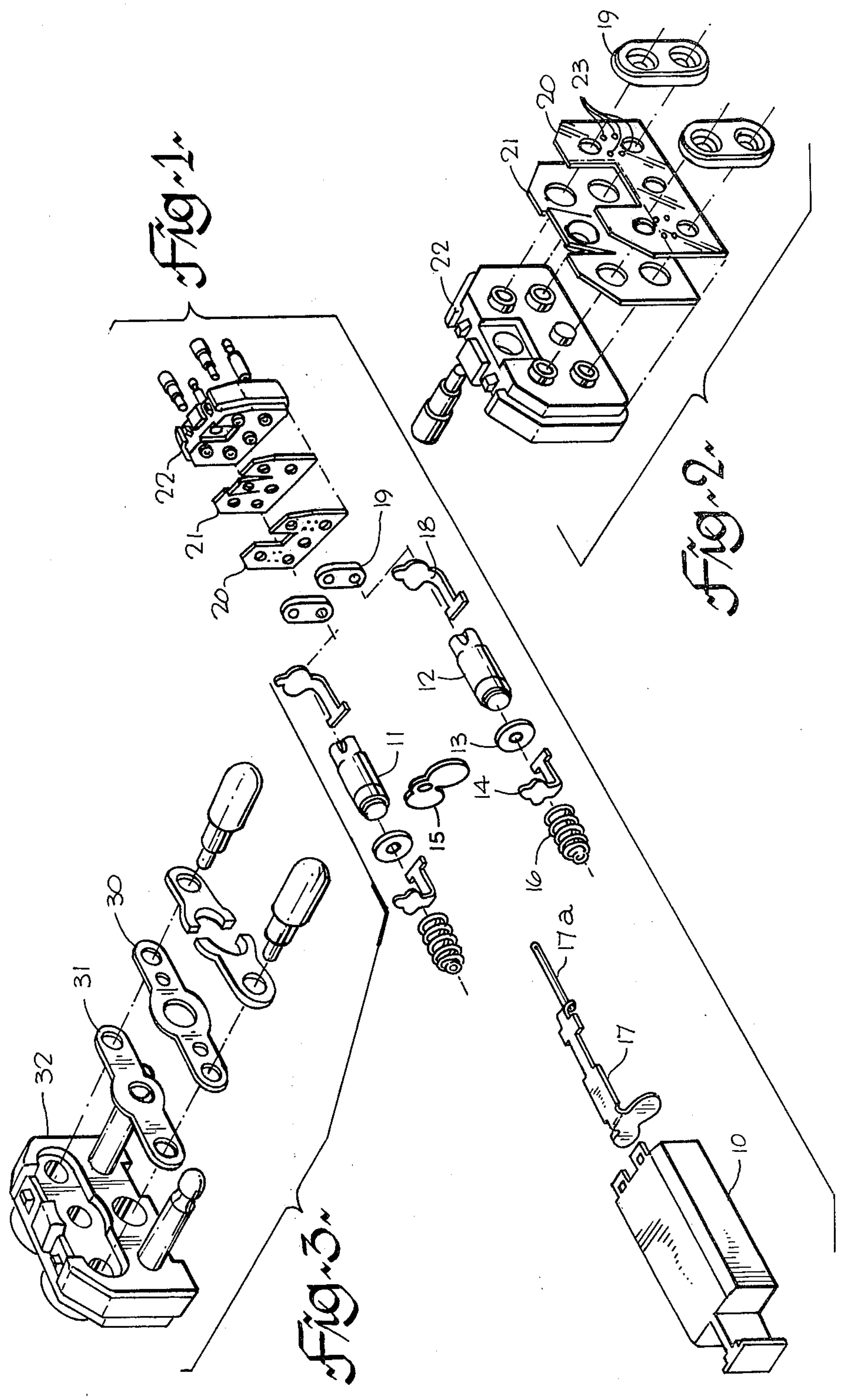
FIG. 1 is an exploded view of a standard (five-prong) protector module incorporating the external spark gap assembly of the present invention.
FIG. 2 is an exploded view of the base assembly including the external spark gap.
FIG. 3 is an exploded view of an alternate base assembly incorporating the external spark gap.

With reference to FIG. 1 of the drawings, a five-prong protector module comprises an insulating housing 10 in which are assembled two gas tube arresters 11 and 12, one for the tip conductor and the other for the ring conductor of the telephone line incoming into the customer's premises. The two gas tube arresters 11 and 12 are retained in place by means of various hardware, such as washers, brackets and springs. When the module is fully assembled, each gas tube, for example the gas tube 12, has one electrode contacting shunt washer 15, which contacts a fusible pellet 13 followed by bracket 14, and spring 16, and finally grounding member 17, which contacts the shunt washer 15 and penetrates the base assembly with its ground pin portion 17*a*. Thus, one side of each of the gas tubes 11 and 12 is grounded via the ground pin 17*a* when the module is plugged-in. The other side of the gas tube 12 is in contact with bracket 18 followed by contact 19, which connects the incoming tip (or ring) conductor with its a conductive contiguous insulator plate 20, followed by contiguous ground plate 21, which itself is followed by an insulating module base 22, which retains the whole assembly and abuts the open end of the housing 10 closing it. In addition to the centrally located ground pin 17*a* jutting out of the base 22, there are two pairs of pins (not shown) one on either side of the ground pin, one pair terminating inside in the contact 19 to complete the tip circuit and the other in the opposite contact to complete the ring circuit.

As may be seen more clearly from FIG. 2, a few holes 23 in the insulator plate 20 constitute the external spark gap between the contact 19 and the ground plate 21, each of which acts as one electrode in a two electrode spark gap. Such external spark gap has been introduced by the addition of the two relatively thin plates 20 and 21, which do not appreciably alter the character and assembly of the conventional protector module. The external spark gap protector, provided by the holes 23 between the "electrodes" 19 and 21, is in parallel with the gas tube protector and has a voltage breakdown threshold higher than that of the gas tubes 11 and 12. Should either of the gas tubes 11 or 12 fail to breakdown due to malfunction, the unarrested voltage rise would cause the external gap to breakdown and protect the customer equipment, although permitting a somewhat higher voltage surge before breakdown. Of course, the breakdown voltage of the external gap is primarily dependent on the thickness of the insulator plate, which is preferably 0.005 inch thick Polyester. The ground plate 21 is preferably 0.010 inch thick copper alloy material.

FIG. 3 shows a two-prong protector module having an external spark gap according to the same construction as explained in conjunction with FIGS. 1 and 2, except that the insulator and ground plates (30 and 31) are assembled adjacent the outside surface of the base plate (32). Otherwise, the drawing is self-explanatory.

What is claimed is:

1. A building entry surge protector module having a modified base assembly to provide an external spark-gap, said modified base assembly comprising:

a conductive ground plate contiguous the insulating inner base surface of said protector module;

an insulator plate coextensive and contiguous with the grounding plate insulating it from plug contacts inside the protector module;

said grounding and insulator plates having openings therein for passage of external plugs of said protector module therethrough to establish contact with said plug contacts, the openings in said grounding plate being sufficiently large to preclude any contact with said plugs; and said insulator plate having holes therein intermediate said plug contacts and said grounding plate to provide said external spark-gap.

2. The module of claim 1, said insulator plate being of a material having predetermined dielectric characteristics and predetermined thickness to yield an appropriate predetermined breakdown voltage at atmospheric pressure.

3. The module of claim 2, the combined thickness of said insulator and conductive plates being such as not to substantially increase the overall thickness of said base assembly prior to their incorporation.

4. The module of claim 3, said insulator plate being of Polyester.

5. The module of claim 4, said conductive plate being of a copper alloy.

6. A building entry surge protector module comprising:

an insulating housing having an open end;

an insulating module base closing the open end of said housing;

a conductive grounding plate located within said housing and having one surface contiguous with the inner surface of said module base;

an insulator plate having one surface coextensive and contiguous with the other surface of said grounding plate;

at least one plug contact contiguous with the other surface of said insulator plate; said module base, grounding plate and insulator plate each having apertures for the passage of external plugs therethrough for establishing contact with said plug contact, the apertures in said grounding plate being sufficiently large to preclude contact with said plugs; said insulator plate having further holes therein adjacent said grounding plate and said plug contact to provide an external spark gap for said protector module;

an elongated grounding member positioned within said insulating housing and projecting through openings in said insulator plate, grounding plate and module base, said grounding member making electrical contact with said grounding plate; and at least one gas tube positioned within said housing between said grounding member and said plug contact, said gas tube providing primary protection and said external spark gap back-up protection against over voltage surges imposed on said protector module.

7. The module of claim 6 which comprises two plug contacts and two gas tubes symmetrically arranged with respect to said elongated grounding member.

* * * * *